April 22, 1924.
R. KAUFMAN
LANGUAGE GAME
Filed Nov. 17, 1921
1,491,536
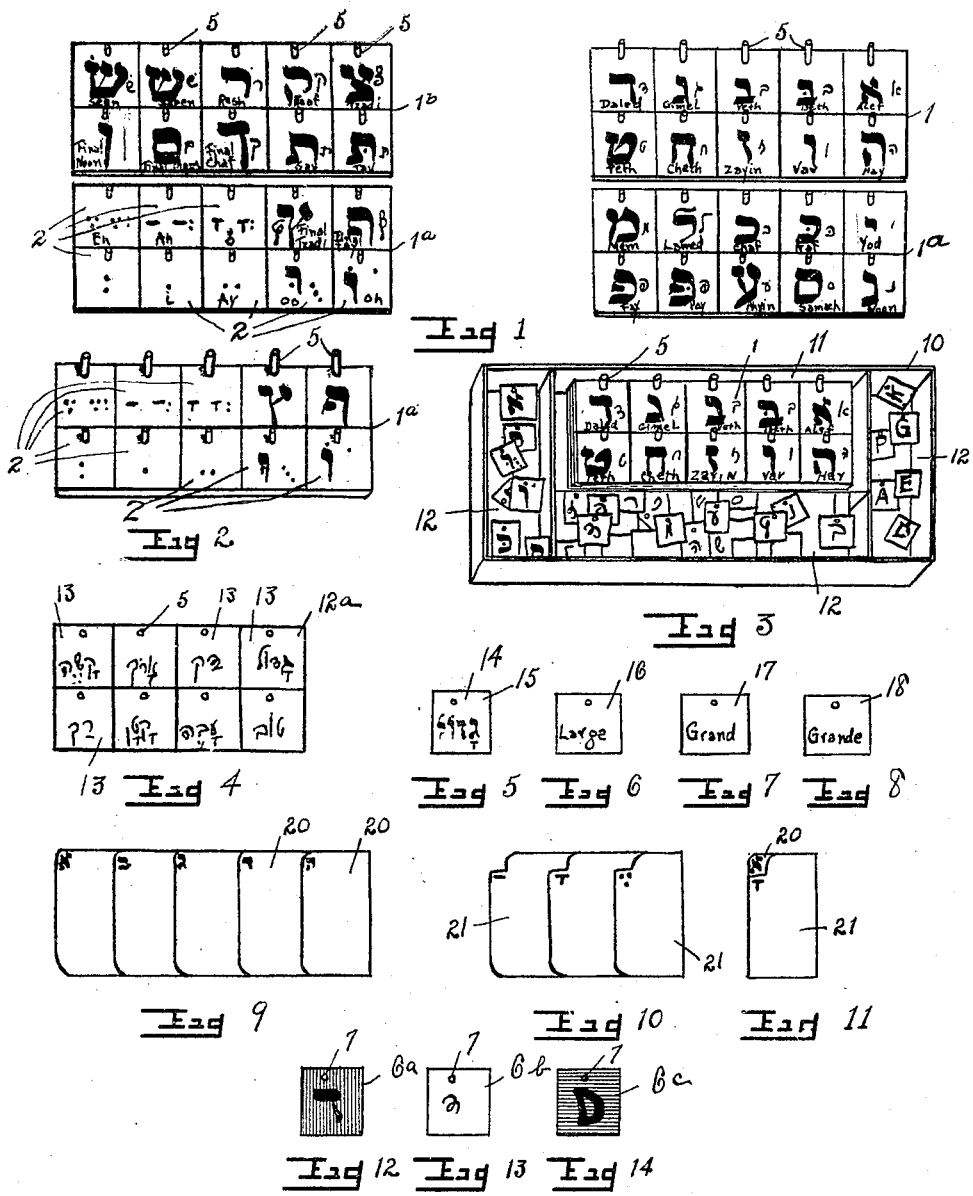
INVENTOR
Reuben Kaufman,
BY
Thomas L. Wilder
ATTORNEY Patented Apr. 22, 1924.

1,491,536

UNITED STATES PATENT OFFICE.

REUBEN KAUFMAN, OF UTICA, NEW YORK.

LANGUAGE GAME.

Application filed November 17, 1921. Serial No. 515,952.

*To all whom it may concern:*

Be it known that I, REUBEN KAUFMAN, citizen of the United States, residing at Utica, in the county of Oneida and State of New York, have invented certain new and useful Improvements in Language Games, of which the following is a specification, reference being had therein to the accompanying drawing.

My invention relates to a language game and I declare the following to be a full, clear, concise and exact description thereof sufficient to enable anyone skilled in the art to which it appertains to make and use the same reference being had to the accompanying drawings in which like reference characters refer to like parts throughout the specification.

The purpose of my invention is to make easy or less difficult the study of a foreign language, especially the Hebrew language, or of the study of several foreign languages simultaneously, whereby even the most laggard person or even a child may learn under circumstances that invite attention. To this end, the study of a foreign language is induced by means of the instrumentality of a lotto game calculated to combine instruction and entertainment. The game takes cognizance of the psychological fact that the element of play, when properly utilized, is a powerful factor in the education of the child.

The game is arranged in a progressive series, starting with the simpler forms, such as the alphabet of a language, and leading to syllables and finally words and literary compositions.

The object of the game will be understood by referring to the drawings in which:

Fig. 1 is a perspective view, showing a complete set of cards employed spread out in the manner in which they will be used in the game;

Fig. 2 is a detail perspective view of one of the cards employed;

Fig. 3 is a perspective view of a box used for containing the cards and squares used in the game, said cards and squares being therein shown;

Fig. 4 is a detail view of a modified form of cards, showing words represented thereon;

Fig. 5 is a detail view of a counter or square showing a word in the Hebrew language represented thereon, which is employed in the game;

Fig. 6 is a detail view of another counter or square, showing a word in the English language; thereon;

Fig. 7 is a detail view of still another counter or square, showing a word in the French language thereon;

Fig. 8 is a detail view of still another counter or square, showing a word in the Spanish language thereon;

Fig. 9 is a view of a modified form of the game, showing cards with Hebrew consonants represented in the upper left hand corner thereof;

Fig. 10 is view of several cards, employed in combination with the cards of Fig. 9 in playing the game; and having vowels represented thereon Fig. 11 is a detail view, showing the arrangement of the cards of Figs. 9 and 10;

Figs. 12, 13, and 14, are detail views of the counters or squares used in connection with the cards of Fig. 1 in playing the game.

Referring more particularly to the drawings, the game embodies a series of cards 1 and 1ª. The face of each card 1 is divided into ten equal squares and in each square is represented a letter of a foreign language. The letters are arranged in alphabetical order. The same language being used through the set. In the present instance, the letters in large type are of the Hebrew language. There is shown also beside the Hebrew letter, a syllable, writen just below the letter in English characters, which syllable represents the Hebrew name of the letter. Moreover, there is shown also in the same square to the right, the Hebrew letter in script. Inasmuch, as the Hebrew language is written from right to left, the letters of the alphabet shown in Fig. 1 start in the upper right hand square of the card 1 on the right and read alphabetically in the same manner through the card directly below and then to the upper left hand card 1 and finally to the card directly below that card 1. In the last eight squares 2 of card 1ª is represented the eight Hebrew vowels, so that three of these cards 1 and a card 1ª are employed to form a complete alphabet including the eight Hebrew vowels.

Furthermore, the cards 1 and 1ª which may be made of pasteboard or of wood are provided with vertically disposed pegs 5 arranged, one in each square space for the projection thereon of the individual counters or squares 6, bearing the letters, syllables or words, in accordance with the set of cards 1 and 1ª being used. Holes 7 are punched in said counters or squares 6, whereby they may be placed over the peg 5 and upon the corresponding square space indicated on the proper card —1— or 1ª.

The counters or squares are made in three sets, each bearing a distinctive color. The set having the color red and here designated by 6ª, bearing the representation of Hebrew letters in large type corresponding to the type of the letter employed on the proper card 1 or 1ª. The second set 6$^b$ having the color white, has the Hebrew letters in script, and the third set 6$^c$ having the color blue has the corresponding sound of the Hebrew letter in English.

These cards 1 and 1ª and counters or squares 6 are kept for convenience sake in a box 10 having a large compartment 11 for the disposition of the cards 1 and 1ª and three small compartments 12, for the disposition of the counters or squares 6. The counters 6 are segregated according to color.

It will be noted that the counters or squares 6 do not have the names of the Hebrew letters written underneath as in the case of the cards 1 and 1ª. The purpose of which omission is to enable the scholar to learn to recognize the Hebrew characters by the characters themselves and without the aid of the name thereof, which appears in the corresponding space on the cards 1 and 1ª.

The game is played by first distributing the cards 1 and 1ª to the players. Each of the four players places his card face upward on the table. The counters or squares 6 are called off then by one of the players, starting with the red counters 6ª having the Hebrew letters represented thereon. The player having the corresponding Hebrew letter on his card will claim the counter 6 and place the same over the peg 5 on its proper square space on cards 1 and 1ª.

After the announcer has called off all the red counters 6ª, he will proceed to call off the white counters 6$^b$, bearing the Hebrew letters in script and then in like manner proceed with the blue counters 6$^c$ bearing the corresponding English sounds of the Hebrew letters. The player who fills his card first is to be considered the winner and is entitled to as many points as the other players have vacant spaces unfilled on their respective cards.

The winner has the privilege of calling off the counters or squares 6ª, 6$^b$ and 6$^c$, in the next game, where more than a single game is played.

Although the above rules of playing the game will be found useful, obviously the game will admit of many others, which may be adapted to suit the desires of the players.

Figs. 4 and 5, show a modification adapted to teach a plurality of foreign languages, simultaneously. Here the card 12ª, of which there are a plurality, is divided into eight equal square spaces having represented in each space a Hebrew word in script. The counters or squares 14 used to cover the spaces 13 are arranged in sets. One set 15 has Hebrew words in script thereon to correspond with the like words represented on the several spaces 13 of cards 12. A second set 16, has the corresponding English words; then a third set 17 has the French words; the fourth set 18 has the Spanish words, and there may be still other sets having other foreign words thereon.

Each set, as 15, 16, 17 and 18, are called off successively, by one of the players, and disposed upon their respective spaces 13 on cards 12ª. The counters 14 will be claimed, as they are called off, by the players having the corresponding word on their respective card 12ª. The rules may be substantially as in the former game.

Figs. 9, 10 and 11, show a still further modification. A set of cards is employed. In the upper left hand corner of each of said cards is printed one of the letters of the Hebrew language or of any other language, if employed. Cards 20 have, in each instance, a single consonant of the Hebrew alphabet printed in the upper left hand corner, and cards 21 have printed a single Hebrew vowel of the Hebrew alphabet, just below the upper left hand corner, which is cut away, in order to disclose the consonant of a card 20, when cards 20 and 21 are combined, back to face, the one 20 under card 21. With these cards 20 and 21, containing the consonants and vowels, words may be constructed.

There will be as many cards 20 as there are consonants in the Hebrew language, if that language is adopted for the game, and as many cards 21 as there are vowels. However, the game may be enlarged to admit of a greater or less number of players, by duplicating or even triplicating the cards 20 and 21.

The game is played by dealing out ten cards 20 having consonants printed thereon and ten cards 21 having vowels printed thereon to each player. After the cards 20 and 21 have been thus dealt, the remaining cards are placed in two packs upon the table. The consonants in one pack and the vowels in the other. A certain passage from any book is selected and read aloud by one of the players. The players must construct words, which are found in the selected passage. Each player in turn draws one card 20 and one card 21 and discards a pair underneath the respective packs. The player who succeeds first in forming all his cards 20 and 21 into words wins the game.

Having thus described my invention what I claim as new and desire to secure by Letters Patent is:

1. In a language game, a set of cards having spaces indicated thereon, the printed and script letters of a foreign language represented in said spaces, the name in English characters of said foreign language also represented in said spaces, and counters having corresponding letters but not the name in English characters represented thereon adapted to fit upon said spaces, whereby to teach a foreign alphabet.

2. In a language game, a set of cards having spaces indicated thereon, the printed and script letters of a foreign language represented in said spaces, the name in English characters of said foreign language also represented in said spaces, and counters of different colors having corresponding letters but not the name in English characters represented thereon adapted to fit upon said spaces, whereby to teach a foreign language.

3. In a language game, a set of cards having spaces indicated thereon, the printed and script letters of a foreign language represented in said spaces, the name in English characters of said foreign language also represented in said spaces, counters having corresponding letters but not the name in English characters represented thereon, adapted to fit upon said spaces, whereby to teach a foreign language, and vertically disposed pegs attached to said cards, and said counters having apertures for the projection of said pegs, whereby to hold the counters on said spaces in a demountable manner.

In testimony whereof I have affixed my signature.

REUBEN KAUFMAN.